United States Patent
McQuaide, Jr.

(10) Patent No.: US 9,241,114 B1
(45) Date of Patent: Jan. 19, 2016

(54) UNIFORM UNIVERSAL REMOTE CONFIGURATION

(75) Inventor: Arnold Chester McQuaide, Jr., Berkeley Lake, GA (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 1527 days.

(21) Appl. No.: 11/865,903

(22) Filed: Oct. 2, 2007

(51) Int. Cl.
*H04L 17/02* (2006.01)
*H04N 5/268* (2006.01)

(52) U.S. Cl.
CPC ................................... *H04N 5/268* (2013.01)

(58) Field of Classification Search
CPC .................................................. H04N 5/268
USPC ................................................. 341/173, 176
See application file for complete search history.

(56) References Cited

U.S. PATENT DOCUMENTS

| | | | | |
|---|---|---|---|---|
| 5,386,251 A * | 1/1995 | Movshovich | ...... | H04N 5/44582 340/12.23 |
| 6,538,595 B1 * | 3/2003 | Tucker | ................. | G06F 3/0213 341/178 |
| 7,639,115 B2 * | 12/2009 | Valoteau | ................ | G08C 19/28 340/12.23 |
| 7,719,438 B2 * | 5/2010 | Hardacker | ............. | G05B 15/02 340/10.1 |
| 8,823,485 B2 * | 9/2014 | Schmidt et al. | ........ | G08C 17/00 340/12.23 |
| 2005/0166240 A1 * | 7/2005 | Kim | .................... | H04N 5/44513 725/78 |
| 2005/0202871 A1 * | 9/2005 | Lippincott | .............. | A63F 13/12 463/39 |
| 2006/0129458 A1 * | 6/2006 | Maggio | .................. | G06Q 30/02 705/14.2 |
| 2007/0165555 A1 * | 7/2007 | Deng | ..................... | G08C 23/04 370/318 |
| 2007/0296552 A1 * | 12/2007 | Huang | ................... | G08C 17/02 340/10.5 |
| 2008/0006696 A1 * | 1/2008 | Piersol | ............ | G06K 19/07381 235/451 |
| 2008/0151126 A1 * | 6/2008 | Yu | ........................ | H04N 5/4403 348/734 |
| 2008/0157993 A1 * | 7/2008 | Du Breuil | .............. | G08C 17/02 340/5.64 |
| 2009/0002981 A1 * | 1/2009 | Knibbe | ..................... | G01S 5/14 362/233 |

FOREIGN PATENT DOCUMENTS

WO    WO 2007072314 A1 *   6/2007

* cited by examiner

*Primary Examiner* — Amine Benlagsir
(74) *Attorney, Agent, or Firm* — Scott P. Zimmerman, PLLC

(57) ABSTRACT

Providing uniform universal remote configuration is described herein. In different aspects, the techniques may include sending an identification (ID) request to a remote control and receiving an ID response from the remote control in response to the ID request. The ID response may be used to configure a device to process a plurality of control signals from the remote control.

7 Claims, 5 Drawing Sheets

UNIFORM UNIVERSAL REMOTE CONFIGURATION

FIELD OF THE DISCLOSURE

The present disclosure relates to configuring a remote control, and more specifically, to techniques and apparatus for detecting and configuring a universal remote control for operating a device.

BACKGROUND

Remote controls are used to selectively control an assortment of devices including televisions, video devices, audio devices, and other electrical/mechanical devices. An increasing supply of devices which may be operated using remote controls has led to an increased demand for universal remote controls. Universal remote controls that operate multiple devices or replace and/or supplement existing remote controls have become increasingly popular. Typically, a universal remote control is configured with a device code that identifies the device that the remote control will operate. For example, a user may look up a device code from an instruction manual for the remote control, or other source, which lists device codes for other manufacturers and/or devices. The device code may be entered into the remote control, which in turn allows the remote control to properly communicate with the desired device.

The list of devices that are controlled by universal remote controls is continually expanding. For example, a new manufacturer may enter the consumer electronics market and use a new device code that is not yet established for a particular universal remote control. In addition, new hardware devices are continually entering the market which provide higher resolution video or improved audio playback, whereas such devices may include features not anticipated by current universal remote controls. These situations often make configuring a remote control difficult or impossible.

Therefore, there remains an unmet need to simplify configuration of a universal remote control while allowing new devices to be controlled with preceding universal remote controls.

SUMMARY

Techniques and apparatus for providing Uniform universal remote configuration are described herein. In different aspects, the techniques may include sending an identification (ID) request to a remote control and receiving an ID response from the remote control in response to the ID request. The ID response may be used to configure a device to process a plurality of control signals from the remote control.

In other embodiments, the apparatus may include a configuration detector configured to detect an identification tag from a uniform universal remote. A remote control signal receiver may be configured to receive a control signal from the uniform universal remote. In addition, a controller may be operably coupled with the configuration detector and the remote control signal receiver, the controller configured to process the identification tag and the control signal.

Other systems, methods, and/or computer program products according to embodiments will be or become apparent to one with skill in the art upon review of the following drawings and detailed description. It is intended that all such additional systems, methods, and/or computer program products be included within this description, be within the scope of the present disclosure, and be protected by the accompanying claims.

BRIEF DESCRIPTIONS OF THE DRAWINGS

The teachings herein are described with reference to the accompanying figures. In the figures, the left-most digit(s) of a reference number identifies the figure in which the reference number first appears. The use of the same reference number in different figures indicates similar or identical items.

DETAILED DESCRIPTION

Overview

Universal remote controls for electrical/mechanical devices are currently either difficult to set up or complex and are expensive. Rather than relying on a user to set up a remote control by entering a device code, or other methods to program the remote control to identify a device, this disclosure reverses the process such that the device is configured to identify the remote control. The device may identify the remote control, or the functionality of the remote control, by exchanging information with the remote control. In other embodiments, the device may be manually programmed by entering information about the remote control, such as an identification number. Therefore, rather than standardizing the remote operation of devices, the disclosure contemplates establishing standards for remote controls, which may be easily identified by the device or manually entered into the device. The remote control standards may allow a user to more easily configure a remote control for operating a device. Further embodiments of the disclosure include expanded functionality of the remote control and/or device, including without limitation prioritizing the processing of commands from the remote control and implementing privileges associated with the remote control.

Illustrative Uniform Universal Remote Configuration

Figure 1:
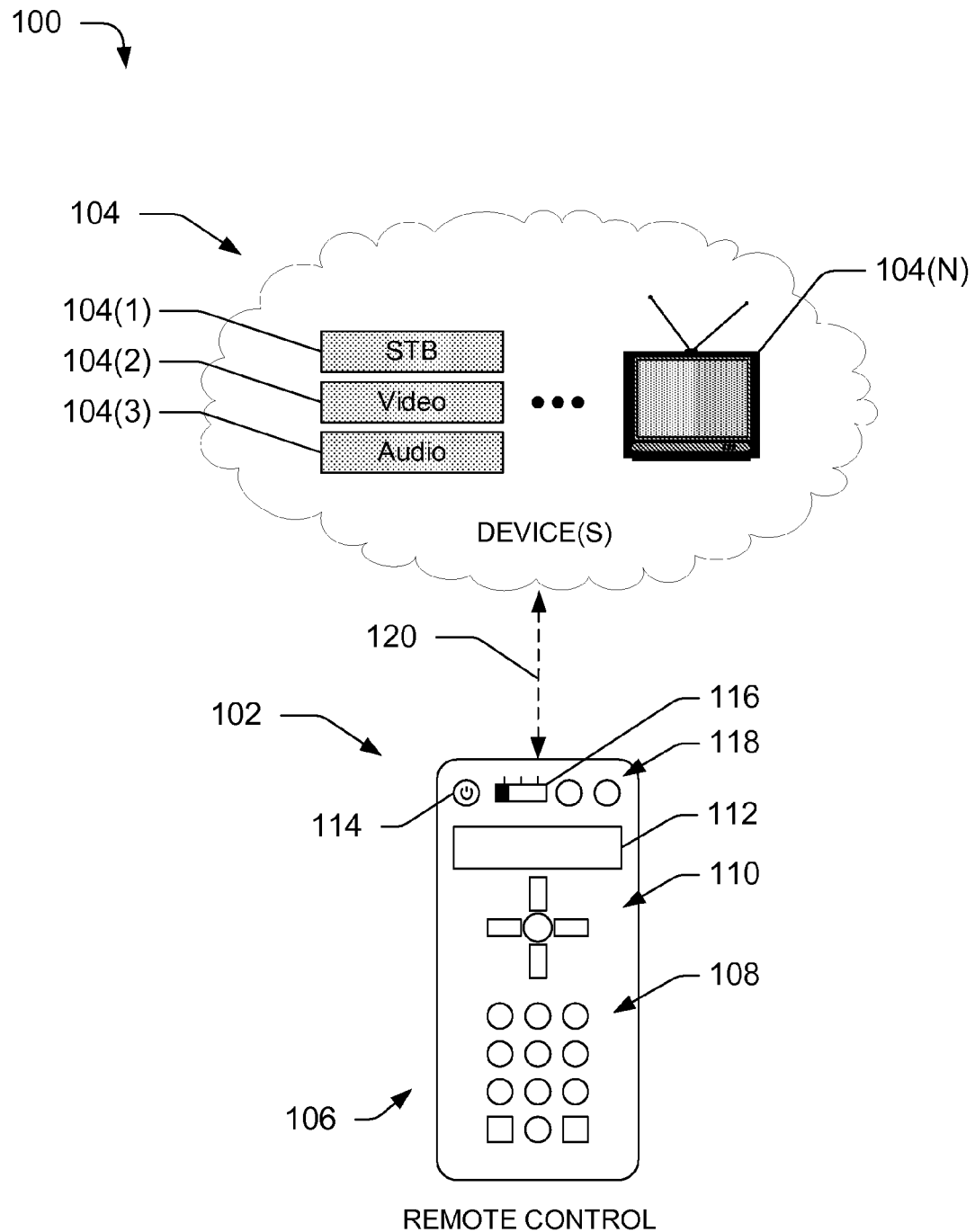
FIG. 1 is a schematic view of an illustrative uniform universal remote and one or more devices in accordance an embodiment of the disclosure.

FIG. 1 is a schematic view of an illustrative uniform universal remote and one or more devices in accordance an embodiment of the disclosure. The environment 100 includes a remote control 102. The remote control 102 may be any type of remote control used to operate an electrical/mechanical device. For example, the remote control 102 may include a basic remote control (e.g., having limited features or device controls) and/or a multifunction remote control that may operate one or more devices 104.

The devices 104 may include a set top box (STB) 104(1) or similar device (e.g., digital video recorder, cable box, etc.). The devices 104 may also include a video device 104(2), such as a digital versatile disc (DVD) player, video cassette recorder (VCR), or similar device, and an audio device 104(3) such as an audio receiver or tuner, a compact disc (CD) player, a MP3 player, or other audio devices. In addition or alternatively, the devices 104 may include a display 104(N), such as a digital or analog television.

The remote control 102 may have a number of elements 106. The elements 106 may include a keypad 108 (e.g., a numeric keypad), a multifunction control section 110 (e.g., arrow keys and a selection button), a display portion 112, a power input 114, a selection switch 116 (such as to select devices for operational control), and additional controls 118 for controlling the devices 104. For example, the additional controls may include a finger scanner for identifying a user of the remote control 102.

The remote control 102 may communicate with the devices 104 by transmitting and/or receiving signals 120. For example and without limitation, the remote control 102 may communicate with the devices 104 using an optical signal, an ultraviolet signal, an infrared signal, an acoustic signal, a Bluetooth® signal, a Wi-Fi signal, or a radio-frequency identification signal.

Figure 2:
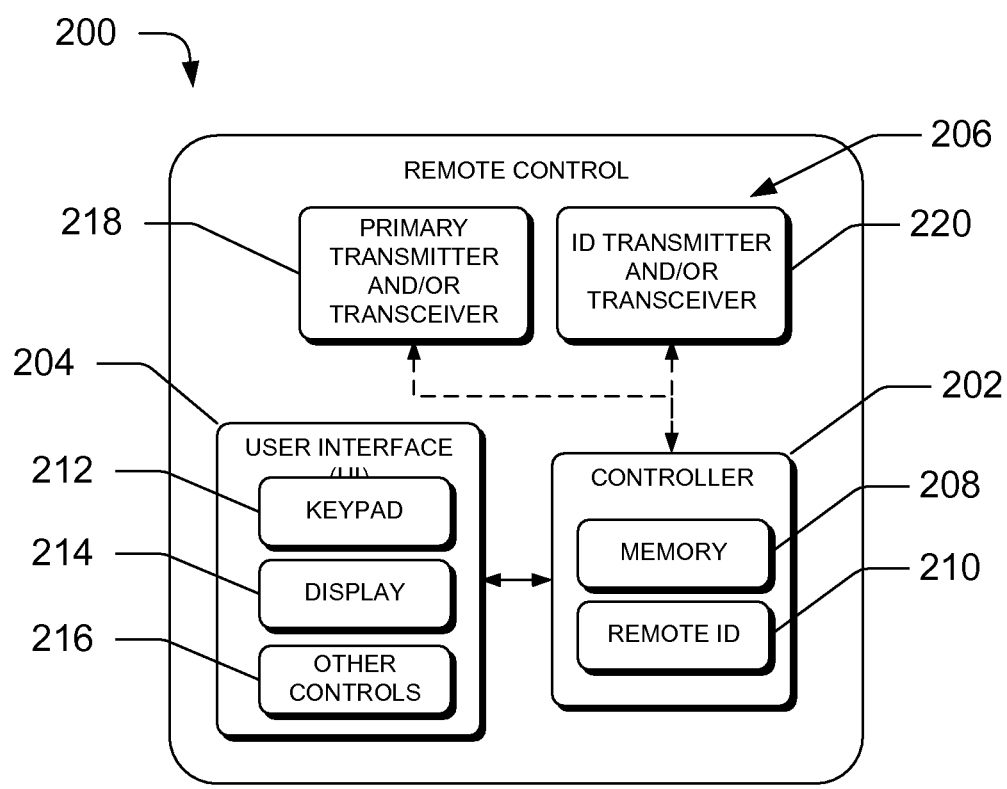
FIG. 2 is a block diagram of an illustrative uniform universal remote showing how the remote control may be organized.

FIG. 2 is a block diagram of an illustrative uniform universal remote 200 showing how the remote control may be organized. The remote control may include a controller 202 operably coupled to a user interface (UI) 204, and one or more transmitters 206. The controller 202 may have memory 208, such as flash memory, and encoded information such as a remote identification (ID) 210. The UI 204 may include without limitation elements such as a keypad 212, a display 214, and other controls 216. The transmitters 206 may include a primary transmitter 218 and an ID transmitter 220 for communicating with a device, such as the device 104(1). For example, the primary transmitter 218 may transmit infrared control signals to a television for operating the television (e.g., to change channels, etc.). The ID transmitter 220 may be used to configure the remote control 102 to communicate with the device. The primary transmitter 218 and/or the ID transmitter 220 may also be a transceiver, thus enabling the remote control 200 to transmit and receive signals.

In an illustrative operation of the remote control 200, the controller 202 may receive data obtained via the UI 204, such as a channel entered on the numeric keypad 212. The controller may store the data (e.g., channel entry) in the memory 208 and generate a control signal for transmission to a device, such as the device 104(1). The control signal may include a packet of data, such as the channel and the remote ID 210. The signal may be transmitted to the device via the primary transmitter 218, thus allowing a user to operate the device.

In another illustrative operation, the remote control 200 may receive an ID request from the device. The ID request may be received by the ID transmitter 220, transmitted to the controller 202 to obtain the requested information (e.g., remote ID 210), sent back to the ID transmitter 220 for transmission back to the device. This operation may configure a device to be controlled by a uniform universal remote, such as the remote control 200.

The remote control 200 may include functionality in addition to sending control signals to a device. For example, the remote control 200 may be a mobile phone capable of transmitting an optical or radio frequency signal, such as a Bluetooth® signal, to a device. In other embodiments, the remote control 200 may be a computing device, such as a laptop computer, personal data assistant (PDA), handheld gaming device, or other computing device capable of transmitting a control signal to the device.

Figure 3:
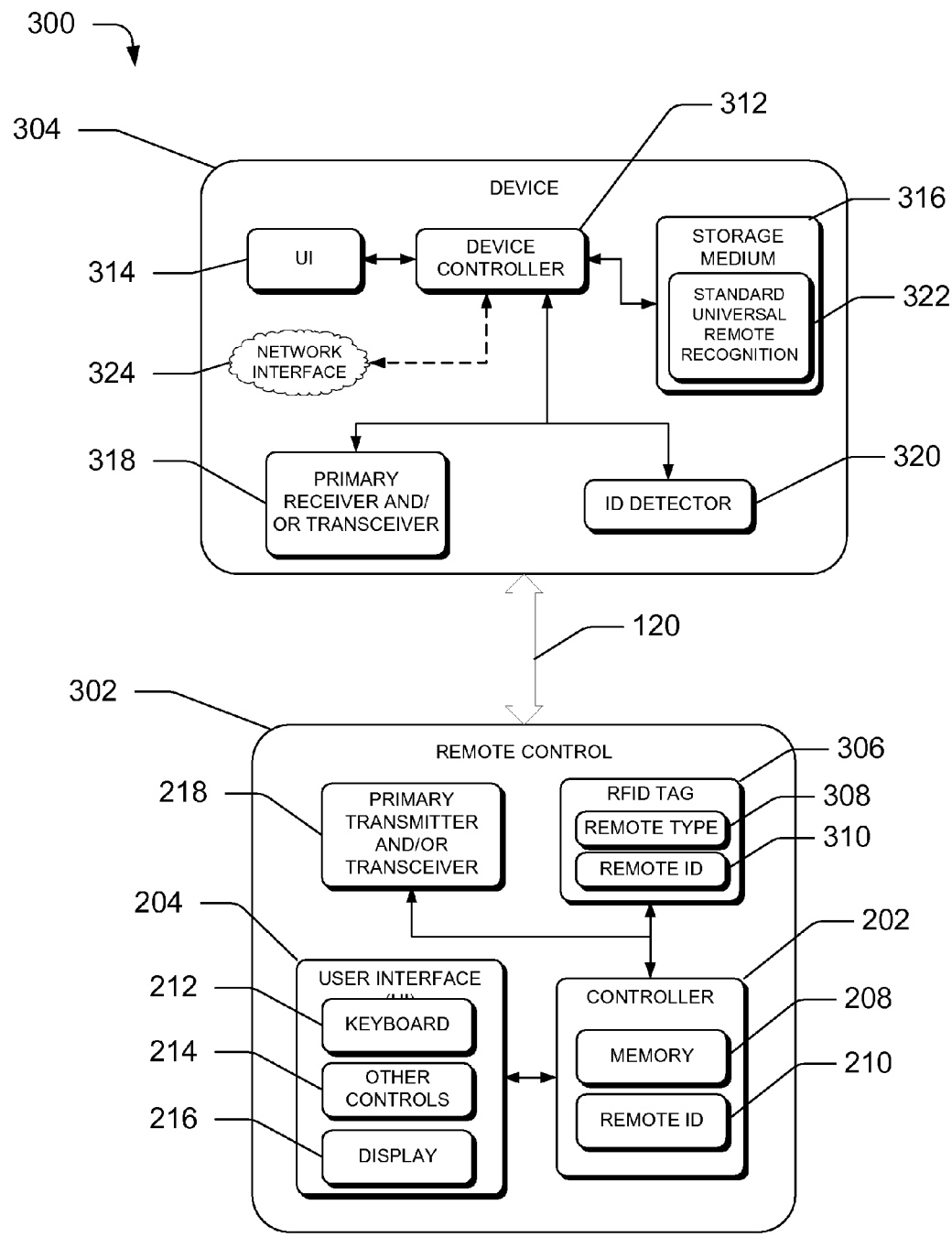
FIG. 3 is a block diagram of an illustrative uniform universal remote and a device, showing how a system may be organized.

FIG. 3 is a block diagram of an illustrative uniform universal remote and a device, showing how a system may be organized. An environment 300 includes a remote control 302 and a device 304. The remote control 302 includes a radio-frequency (RFID) tag 306 to transmit a signal to the device 304. For example, the RFID tag 306 may be a passive RFID tag which does not require a power source from the remote control 302, thus reducing undesirable battery drain. The RFID tag 306 may include information such as the remote control type 308 and the remote ID 310.

The device 304 may have a device controller 312 operably coupled to a device user interface (UI) 314, a storage medium 316, a primary receiver 318, and an ID detector 320. The storage medium 316 may include a uniform universal remote recognition module 322, which may include a set of instructions for converting the signals received from the primary receiver 318, and processed by the device controller 312, into signals which controllably operate the device 304. For example, the primary receiver 318 may be enabled to receive a control signal from a remote control while the ID detector 320 may be a configuration detector for identifying information about the remote control 302. In addition, the primary receiver 318 may also be a transceiver, and thus transmit information to the remote control 302, such as channel information for projection on the display 214 included in the user interface 204.

In some embodiments, the device 304 may further include a network interface 324 operably connected to the device controller 312. The network interface 324 may allow the device 304 to update one or more modules within the storage medium 316, such as the uniform universal remote recognition module 322. For example, if an update to a uniform universal remote is created (e.g., new remote control instructions), the device 304 may obtain the update via the network interface 324. This may provide a technique to update the uniform universal remote recognition module 322.

Illustrative Operation

Figure 4:
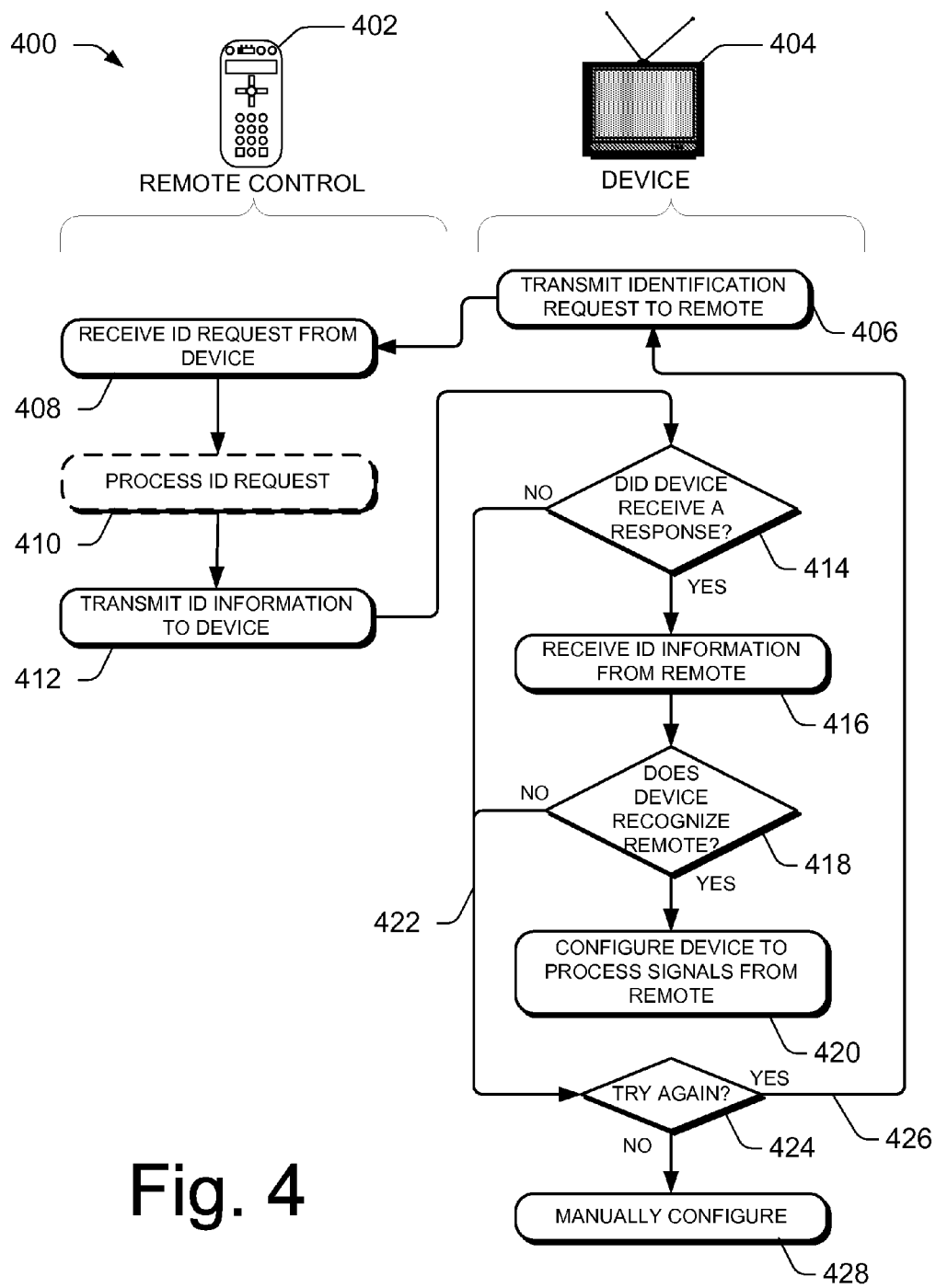
FIG. 4 is a flow diagram of an illustrative configuration of a uniform universal remote and device in accordance with an embodiment of the disclosure.

FIG. 4 is a flow diagram of an illustrative process 400 for configuring a uniform universal remote and device in accordance with an embodiment of the disclosure. The process 400 includes elements associated with or preformed by either a remote control 402 or a device 404, however, in some instances the elements may not be exclusive to either the remote control or device.

For illustrative purposes, the process 400 may begin at a block 406 where the device 404 transmits an identification request to the remote control 402. For example, the identification request may be transmitted by the ID detector 320 (e.g., a RFID scanner). At a block 408, the ID request is received by the remote control 402. At an optional block 410, the remote control 402 may process the request received at the block 408. For example, the remote 402 may analyze the ID request via the controller 202, which may access the memory 208 and/or the remote ID 210. At a block 412, the remote control 402 may transmit ID information to the device 404. For example, the remote control 402 may include a RFID tag which may receive an ID request (at the block 408), and transmit ID information (at the block 412), such as a remote type and a remote ID code to the device.

The process 400 further includes a decision block 414 to determine if the device 404 received a response to the request from the block 406. If the process 400 determines that the device 404 received a response, the process continues to a block 416 to receive the ID information from the remote control 402. In such an instance, the process 400 continues to a second decision block 418 where the process determines if the device 404 recognizes the remote control 402. If the process 400 determines that the device 404 recognizes the remote control 402, the process proceeds to a block 420 where the device is configured to process control signals from the remote control.

If the determination at the first decision block 414 or the second decision block 418 is 'no,' the process 400 is directed along a route 422 to a decision block 424. The decision block 424 determines if the process will 'try again,' or otherwise try to automatically configure the device 404 to communicate with the remote control 402. If the process 400 attempts to configure the device again, the process proceeds along a route 426 back to the block 406 and the process begins again. Otherwise, the process 400 advances to a block 428 where the device 404 is manually configured. For example, the device may be manually configured by entering a remote control code into the device 404 though the user interface 314.

In other embodiments, the device 404 may be in communication with a network, such as the Internet. The device 404 may submit a request or query to the network when configuring a remote, such as remote 402, that is not recognized by the device. The request may occur in real-time or near real-time. The network may enable configuring the device 404 to operate with the remote 402, such as by transmitting to the device 404 the information necessary to configure the remote 402. In further embodiments, the remote 402 may operate in a basic mode (e.g., default mode) when it is undetected by the device 404. For example, the remote 402 running in a basic mode may only operate basic remote control functions such as providing remote on/off and up/down controls (e.g., channel change for TV, scene skip for DVD, song skip for CD). Other basic operations are also contemplated. Optionally, a customer may be offered selection of the basic mode as an option if automatic recognition fails.

In one illustrative configuration process, a user may locate the remote control 402 within a predetermined range from the device 404, such that the device can communicate with the remote control. The range may be determined by the capabilities of the communication method, such that a first range may exist for transmitting Bluetooth® signals, a second range may exist for transmitting RFID signals, and so on. Once the remote control 402 is within the range, the device 404 may be activated to detect the remote control. In some instances, the user may trigger the device 404 to detect the remote control 402, such as by pressing a button on the device. In other instances, the device 404 may continually transmit a communication signal to the remote control 402 at predetermined intervals, such that no action is necessary from the user to configure the remote control.

Figure 5:
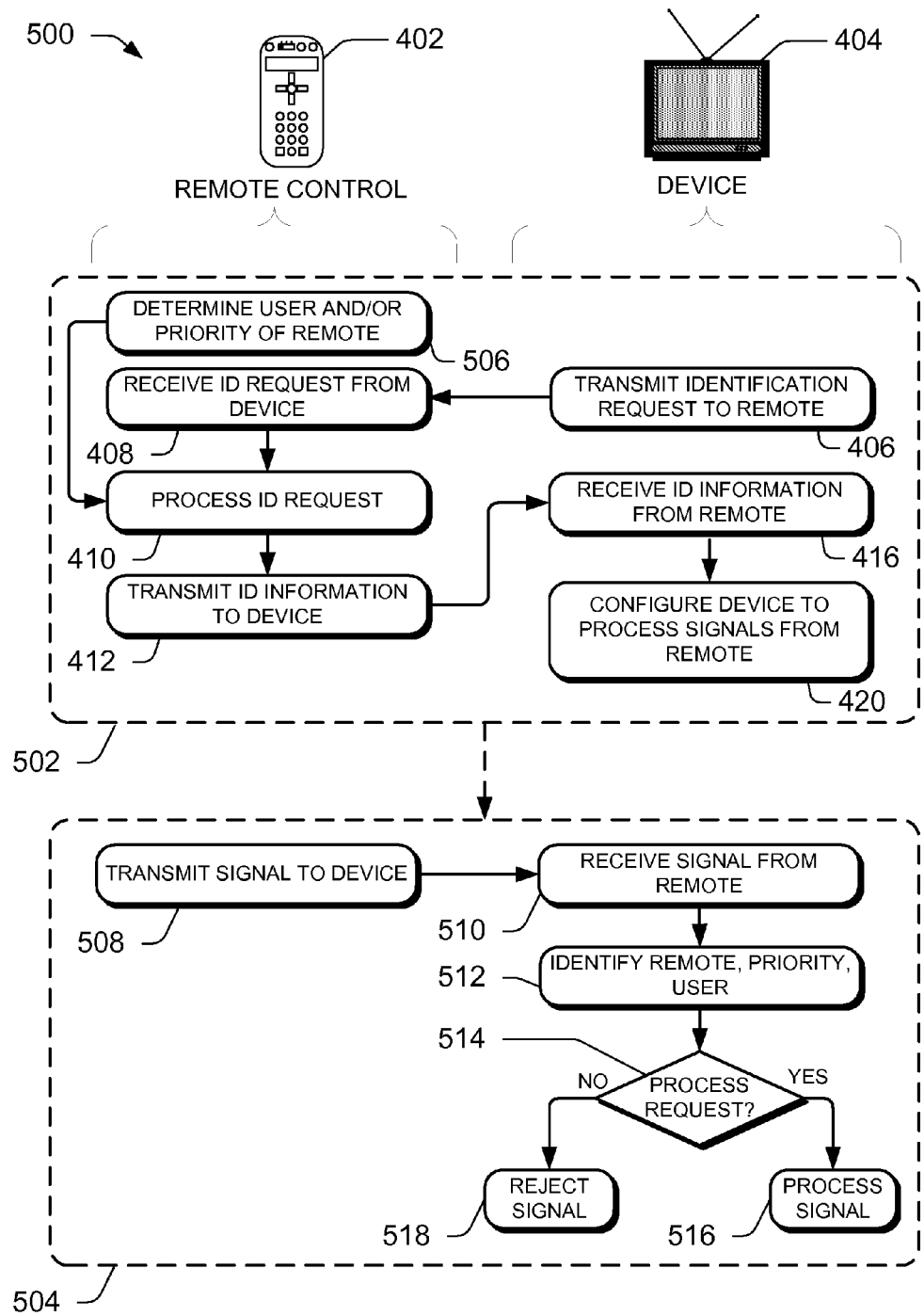
FIG. 5 is a flow diagram of an illustrative operation of a uniform universal remote and device showing configuration and control of the remote control and/or device.

FIG. 5 is a flow diagram of an illustrative operation 500 of a uniform universal remote and device showing configuration and control of the remote control and/or device. The process 500 includes a configuration process 502 and an operation process 504, each described in turn.

The configuration process 502 is similar to the configuration process shown in FIG. 4, and therefore only additional features will be described. At a block 506, the remote control 402 determines the user and/or priority of the remote control. For example, the remote control 402 may use the additional controls 118, such as a finger scanner, to determine the identity of a user operating the remote control. In addition or alternatively, the remote control may be assumed to belong to a specific user, such as a child in a family household. The remote 402 may also accept a personal identification number (PIN) which may be used to identify a user. The remote 402 may prompt the user to enter a PIN, such as by a display on the remote 402 or a display on the device 404. As described below in the operation process 504, the user information may impact the processing of control signals from the remote control 402. The priority of the remote control 402 may allow the control signal of a first remote control to be implemented when a second control signal from a second remote control is received substantially simultaneously or within a specified time range, such as 10 seconds. Prioritization may reduce confusion or 'dueling of remote controls,' such as an instance that may occur between children competing over control of a television.

In additional embodiments, the configuration process 502 may be stored in the storage medium 316. In some instances, the device 404 may attempt to locate a configured remote control 402 based on information stored in the storage medium 316. In addition, the storage medium 316 may allow the device 404 to be configured with multiple remote controls, such as one for each family member or multiple universal remote controls for an entertainment system.

The operation process 504 includes a block 508 where the remote control 402 transmits a control signal to the device 404. For example, the control signal may be a command to change the channel of a television. At a block 510, the device 404 receives the signal from the remote control 402. At a block 512, the device identifies the remote control. In addition or alternatively, the device 404 may identify the priority of the remote control signal and/or the user of the remote control. At a decision block 514, the device 404 determines whether to process the request from block 508. The operation process 504 may determine to process the signal at a block 516, such as if the determined user or prioritization is allowed by the operation process 504. For example, the operation process may not allow a user, who is identified as a child under age 18, to view movies with an R-rating. In another example, the second remote control's control signal may not be processed if the first remote control's signal was processed first. In such instances where the operation process 504 does not process the signal, the signal is rejected at a block 518.

In an illustrative operation process 504, the remote control 402 may transmit to the device 404 a packet of information along with the control signal. For example, the packet of information may contain the remote identification number (e.g., serial number), such as "remote 123456," the remote control's type, such as "Universal Remote Type-A," and any other relevant information including without limitation the priority and privileges associated with the remote control. In some instances, some of the information may be stored on the device 404, such as on the storage medium 316 for association with the remote identification number or other unique identifiers.

In additional embodiments, the remote control 402 may include multiple operating modes, such as a basic and a multifunction operational mode. For example, the basic operational mode may allow a user to change volume, channels, and other basic operations while a multifunction operational mode may allow a user to conduct more sophisticated operations such as view menus, use soft keys, display information on a remote control display, and program the device 404. The embodiments of the disclosure as described above may allow the device 404 to be selectively operated by the remote control using the basic and/or the multifunction operational modes, and may include standardized remote control operations and control signals. In addition or alternatively, a standardized chip (memory, etc.) may be integrated in the device 404 for configuring the remote control 402, and thus performing the functions described here.

CONCLUSION

Although techniques for providing a uniform universal remote configuration have been described in language specific to certain features and methods, it is to be understood that the features defined in the appended claims are not necessarily limited to the specific features and methods described. Rather, the specific features and methods are disclosed as illustrative forms of implementing the claimed subject matter.

What is claimed is:

1. A method, comprising:
sending, from a transceiver in a set top box, a radio frequency identification request to a remote control;
receiving, by a radio frequency detector operating in the set top box, a radio frequency tag sent from the remote control in response to the radio frequency identification request;
identifying, by the set top box, a type of the remote control based on the radio frequency tag;
storing, in a memory of the set top box, different configuration settings associated with different radio frequency tags identifying different remote controls;
comparing, by the set top box, the radio frequency tag sent from the remote control to the different radio frequency tags;
determining, by the set top box, the radio frequency tag sent from the remote control is unrecognized as associated with any of the different configuration settings stored by the set top box;
entering, by the set top box, a basic mode of operation in response to the radio frequency tag being unrecognized, the basic mode of operation only responding to basic commands for power on and off operation and channel changes;
submitting, by the set top box, a query via a communications network for a configuration setting associated with the radio frequency tag sent from the remote control;
receiving, by the set top box, the configuration setting via the communications network that is associated with the radio frequency tag sent from the remote control;
self-configuring, by the set top box, with the configuration setting received via the communications network that is associated with the radio frequency tag sent from the remote control;
retrieving, by the set top box, a priority associated with the remote control based on the radio frequency tag;
simultaneously receiving, by the transceiver in the set top box, two different infrared control signals, one of the two different infrared control signals sent from the remote control and another one of the two different infrared control signals sent from a different remote control;
determining, by the set top box, a prioritization between the two different infrared control signals based on the priority;
first processing, by the set top box, the one of the two different infrared control signals sent from the remote control based on the priority;
ignoring, by the set top box, the another one of the two different infrared control signals sent from the different remote control according to the prioritization; and
receiving a personal identification number that identifies a user of the remote control.

2. The method of claim 1, further comprising receiving the priority in a packet of data sent from the remote control to the set top box.

3. The method of claim 1, further comprising associating the user access privilege to the user of the remote control.

4. A set top box, comprising:
a controller;
a transceiver;
a radio frequency detector;
a network interface; and
a memory storing code that when executed causes the controller to perform operations, the operations comprising:
sending a radio frequency identification request by the transceiver requesting identification of a universal remote control;
receiving a radio frequency tag by the radio frequency detector, the radio frequency tag comprising an identification code sent from the universal remote control;
identifying a type of the universal remote control based on the radio frequency tag;
storing, in the memory of the set top box, different radio frequency tags associated with different configuration settings for different universal remote controls;
determining the radio frequency tag sent from the universal remote control is unrecognized;
entering a basic mode of operation in response to the radio frequency tag being unrecognized, the basic mode of operation causing the set top box to only respond to basic commands for power on and off operation and channel changes;
submitting a query via the network interface to a communications network for a configuration setting associated with the radio frequency tag sent from the universal remote control;
receiving the configuration setting via the communications network that is associated with the radio frequency tag sent from the universal remote control;
configuring the set top box with the configuration setting received via the communications network;
determining a priority associated with the universal remote control from the radio frequency tag;
simultaneously receiving two different infrared control signals by the transceiver, one of the two different infrared control signals sent from the universal remote control and another one of the two different infrared control signals sent from a different universal remote control;
determining a prioritization between the two different infrared control signals based on the priority determined from the radio frequency tag;
first processing the one of the two different infrared control signals sent from the universal remote control based on the priority;
ignoring the another one of the two different infrared control signals sent from the different universal remote control according to the prioritization; and
receiving a personal identification number that identifies a user of the remote control.

5. The set top box of claim 4, further comprising a user interface.

6. The set top box of claim 4, wherein the universal remote control is a mobile phone.

7. A memory storing instructions that, when executed, cause a processor to perform operations, the operations comprising:
sending a radio frequency identification request from a transceiver in a set top box to a universal remote control;
receiving a radio frequency tag by a radio frequency detector in the set top box, the radio frequency tag sent from the universal remote control;
identifying a type of the universal remote control based on the radio frequency tag;
storing, in the memory of the set top box, different configuration settings for the set top box, the different configuration settings associated with different radio frequency tags identifying different universal remote controls;

determining none of the different configuration settings stored in the memory of the set top box are associated with the radio frequency tag sent from the universal remote control;

entering, by the set top box, a basic mode of operation in response to the radio frequency tag being unassociated with the different configuration settings, the basic mode of operation causing the set top box to only respond to basic commands for power on and off operation and channel changes;

submitting a query from the set top box via a communications network for a configuration setting associated with the radio frequency tag;

receiving the configuration setting via the communications network at the set top box that is associated with the radio frequency tag;

configuring the set top box with the configuration setting received via the communications network;

simultaneously receiving two different infrared control signals by the transceiver in the set top box, one of the two different infrared control signals sent from the universal remote control and another one of the two different infrared control signals sent from a different universal remote control;

retrieving a priority associated with the radio frequency tag;

determining a prioritization between the two different infrared control signals based on the priority;

first processing the one of the two different infrared control signals sent from the universal remote control based on the prioritization;

ignoring the another one of the two different infrared control signals sent from the different universal remote control according to the prioritization; and receiving a personal identification number that identifies a user of the remote control.

\* \* \* \* \*